United States Patent
Lind et al.

(10) Patent No.: US 6,753,054 B1
(45) Date of Patent: *Jun. 22, 2004

(54) HEAT SHRINKABLE FILM STRUCTURES WITH IMPROVED SEALABILITY AND TOUGHNESS

(75) Inventors: Keith Duane Lind, Appleton, WI (US); Johnny Qiang Zheng, Appleton, WI (US); Jay Daniel Hodson, Appleton, WI (US); George Herbert Walbrun, Menasha, WI (US)

(73) Assignee: Pechiney Emballage Flexible Europe (FR)

( * ) Notice: Subject to any disclaimer, the term of this patent is extended or adjusted under 35 U.S.C. 154(b) by 0 days.

This patent is subject to a terminal disclaimer.

(21) Appl. No.: 09/443,904

(22) Filed: Nov. 19, 1999

Related U.S. Application Data

(63) Continuation of application No. 08/884,121, filed on Jun. 27, 1997, now Pat. No. 6,051,292, which is a continuation of application No. 08/487,868, filed on Jun. 7, 1995, now abandoned, which is a continuation of application No. 08/011,528, filed on Jan. 29, 1993, now abandoned.

(51) Int. Cl.⁷ .......................... B65B 53/00; B32B 27/08
(52) U.S. Cl. .................... 428/34.9; 428/35.2; 428/35.4; 428/212; 428/516; 428/518; 428/520; 428/910
(58) Field of Search .................. 428/34.9, 35.2, 428/35.4, 212, 516, 518, 520, 910

(56) References Cited

U.S. PATENT DOCUMENTS

| | | | | |
|---|---|---|---|---|
| 4,640,856 A | * | 2/1987 | Ferguson et al. | 428/36 |
| 4,894,107 A | * | 1/1990 | Tse et al. | 156/229 |
| 5,055,328 A | * | 10/1991 | Evert et al. | 428/34.9 |
| 5,059,481 A | * | 10/1991 | Lustig et al. | 428/39.9 |
| 5,283,128 A | * | 2/1994 | Wilhoit | 428/516 |
| 5,620,758 A | * | 4/1997 | Babrowicz | 428/35.2 |
| 6,051,292 A | * | 4/2000 | Lind et al. | 428/34.9 |

* cited by examiner

*Primary Examiner*—Harold Pyon
*Assistant Examiner*—Sow-Fun Hon
(74) *Attorney, Agent, or Firm*—McDermott, Will & Emery

(57) ABSTRACT

A multi-layer packaging film comprising layers having varying degrees of cross-linking when subjected to electron beam (EB) radiation. The outer layer has a high degree of cross-linking to improve the adhesion, strength, toughness and heat resistance of the film and the inner layer has a low degree of cross-linking to improve the sealability. Bags made from the multiple layer films are especially useful for shrink packaging, and particularly for shrink packaging of meats having large cavities.

32 Claims, 3 Drawing Sheets

HEAT SHRINKABLE FILM STRUCTURES WITH IMPROVED SEALABILITY AND TOUGHNESS

This application is a continuation of application Ser. No. 08/884,121, filed Jun. 27, 1997, now U.S. Pat. No. 6,051,292 which was continuation of application Ser. No. 08/487,868, filed Jun. 7, 1995, now abandoned which was a continuation of application Ser. No. 08/011,528, filed Jan. 29, 1993, now abandoned.

BACKGROUND OF THE INVENTION

Heat shrinkable polymer films have gained substantial acceptance for such uses as the packaging of meats and other articles of food. This description will detail the usage of films for packaging meat; it being understood that these films are also suitable for packaging other products such as frozen foods and cheeses. Some of the films embodying this invention are normally used as heat shrinkable bags supplied to the meat packer with one open end, to be closed and sealed after insertion of the meat. After the product is inserted, air is normally evacuated, the open end of the bag is closed, such as by heat sealing, or applying a metal clip, and finally heat is applied, such as by hot water, to initiate film shrinkage about the meat.

In subsequent processing of the meat, the bag may be opened and the meat removed for further cutting of the meat into user cuts, for retail sale, for example, or for institutional use.

Successful shrink bags must satisfy a multiplicity of requirements imposed by both the bag producer and the bag user. Of primary importance to the bag user is the capability of the bag to survive physically intact the process of being filled, evacuated, sealed closed, and heat shrunk. The bag must also be strong enough to survive the material handling involved in moving the contained meat, which may weigh 100 pounds or more, along the distribution system to the next processor, or to the user. Frequently, the meat will have protruding bones that will puncture shrink bags that are not sufficiently strong. Thus, the bag must be strong enough to physically protect the meat.

It is also highly desirable to the bag user that the bag serve as a barrier to infusion of gaseous material from the surrounding environment. Of particular importance is provision of an effective barrier to infusion of oxygen, since oxygen is well known to cause spoilage of meat.

The bag producer requires a product which can be produced competitively while meeting the performance requirements of the user. Thus, the bag material should be readily extrudable, and susceptible to cross-linking by irradiation, with sufficient leeway in process parameters as to allow for efficient film production. The process should also be susceptible to efficient extended production operations. In the irradiation process, the film produced must have improved strength while the inner layer maintains sufficient sealability.

It is important to users of shrink bags that once the meat or other food article is placed in the bag, the bag can be heat sealed to form an air tight bond. Generally, the heat seal is formed by applying heat and pressure to the opposing sides of the bag mouth until the opposing inner layers of the film have fused together.

One of the problems encountered when heat sealing bags made from multiple layer films is that the sealing process causes the film to become deformed in the area where the heat is applied. A solution to this problem known in the art has been to cross-link the film layers by irradiation prior to heat sealing. Cross-linking the film provides improved toughness and increases the heat seal temperature range.

However, cross-linked thermoplastic films are more difficult to melt and produce weaker seals than unirradiated films when heat sealed. Users require that the seals maintain their integrity when the bag containing meat or other food article is immersed in hot water to shrink the film. A bag with weak heat seals that rupture when the bag is shrunk, is of no use. Thus, there is a need for an irradiated multiple layer film which can be made into a bag that will have strong seals when heat sealed.

It is known that heat shrinkable bags for food packaging may be made from multiple layer films in which individual layers have different degrees of cross-linking. Such multiple layer films have been fabricated by forming and irradiating the layers individually and then laminating or extrusion coating the layers to form the multiple layer film. These multiple step fabrication methods produce a more costly film.

Canadian Patent, 1,125,229 discloses a film structure having a heat sealable inner layer and an outer layer wherein the outer layer is cross-linked to a larger extent then the heat sealable layer. The differential cross-linking is achieved by adding a cross-linking enhancer compound to the outer layer, forming the structure, and then irradiating. The irradiation enhancer allows the irradiation dosage to be lowered to a point where the heat sealable inner layer is not adversely affected in its heat sealing characteristics by the radiation. However, the lower irradiation dosage does not produce a bag with the strength and toughness required by users.

U.S. Pat. No. 4,724,176 to Sun, discloses a heat shrinkable container having an unirradiated inner layer, a barrier layer and an irradiated outer layer. This film is coextruded and the outer layer is irradiated by precisely controlling the depth of material that the electron beam irradiation penetrates. This invention limits the cross-linking to the outer layer and therefore, does not improve the strength of the inner layer by cross-linking.

U.S. Pat. No. 5,055,328 to Evert discloses a multiple layer film in which the inner layer contains an antioxidant cross-linking inhibitor to control the degree of cross-linking.

U.S. Pat. No. 4,894,107 to Tse discloses oriented or unoriented multiple layer films with barrier layers that are irradiated for cross-linking. This invention does not teach the selection of polymers for individual layers with different degrees of cross-linking when irradiated.

Many of the multilayer heat shrinkable films with an uncross-linked inner layer and a cross-linked outer layer previously known in the art were made by extruding the outer layer separately from the inner layer. After the outer layer was extruded and irradiated, it would be laminated with the inner layer and any other additional layers to form the multilayer film. In the present invention, the additional expense of separately extruding the irradiated and unirradiated layers and then laminating the layers together is avoided. All of the layers of the films in the present invention can be coextruded and the entire film structure can be exposed to EB radiation. Such films would be widely accepted by those skilled in the art and meet with substantial commercial success.

It is an object of this invention to provide multiple layer cross-linked films with improved sealability and toughness. It is a further object of this invention to provide a coextruded multiple layer cross-linked film having these improvements after subjecting the fabricated multiple layer film structure to a single dose of irradiation. Another object of this invention is to provide a meat or food article packaging bag that will maintain the integrity of heat seals when it is shrunk wrapped.

It should be understood that the objectives stated in or inferred from this specification do not limit the invention as defined in the claims.

Irradiation of polymers causes the formation of covalent bonds between different polymer chains. This process is called "cross-linking". The overall effect of cross-linking is that the molecular weight of the polymer steadily increases with dose, leading to branched chains, until ultimately a tri-dimensional network is formed. This three dimensional network is referred to as the "gel fraction". The gel fractions disclosed herein have been determined in accordance with ASTM D2765. The gel fraction molecules are insoluble while the unlinked molecules remain soluble and are referred to as the "sol fraction". These molecules are separated from the network although they may be highly branched and can be extracted from the bulk polymer by a process that uses a proper solvent. Thus, the gel fraction can be easily measured to determine the extent of cross-linking for various radiation doses.

It has been known in the art that irradiation of polymeric multiple layer films cross-links the layers and produces a film with improved toughness and strength. However, cross-linking also raises the normal melting temperature of a polymer and consequently reduces the heat sealability. Surprisingly, it has been found in the practice of this invention that by the selection of different polymers for the various layers of a multiple layer film, it is possible to have extensive cross-linking in one layer and a minimum amount of cross-linking in another layer when the film is irradiated. This allows the outer layer of a multiple layer film to be cross-linked to provide increased strength and toughness while the inner layer is not cross-linked and retains its heat sealability characteristics.

SUMMARY OF THE INVENTION

The multiple layer films in the invention have inner heat sealant layers and outer protective layers that have different degrees of cross-linking when subjected to electron beam irradiation. More significantly, these films experience incipient cross-linking at different levels of irradiation doses. Thus, by the selection of the materials for the protective and heat sealant layers as taught by this invention, it is possible to form an irradiated multiple layer film having a protective layer with significant cross-linking and a heat sealant layer with only minimal cross-linking.

The irradiation serves at least two significant purposes. First, it enhances the heat resistance of the protective layer of the film. This is evidenced by reduced failure rates in packages which have been heat shrunk or heat sealed. Second, the timing of the irradiation treatment being after the formation of the multiple layer film, substantial freedom is available in selecting the process for fabricating the multiple layer film. Thus the processes which tend to yield higher interfacial adhesion, such as coextrusion, are preferred. Because more desirable formation processes can be used, the resulting films may have substantially improved interfacial adhesion over similar films made by less desirable processes.

The amount of cross-linking in the protective and heat sealant levers is measured by the gel fraction of the material after irradiation. The higher the gel fraction, the greater the amount of cross-linking. Irradiation doses of from about 2 MR to about 10 MR are used to cross-link the films of this invention. The most preferred irradiation dose for the invention is from about 4 MR to about 6 MR. Within this range, the protective layer undergoes significant cross-linking that makes the film tougher and gives it added strength, while the heat sealant layer undergoes an insignificant amount of cross-linking and maintains its heat sealability.

A substantial end use for the films of the invention is in the fabrication of heat sealable shrink bags that are particularly useful in the packaging of meat, especially meat having bony projections or large cavities. Bags made according to this invention find particular utility in forming packages which are subjected to high temperature shrinking processes.

The bags produced from the films in this invention have the following advantages over bags known to the art: 1) the bags are tougher and exhibit superior puncture resistance; 2) the bags have a higher heat seal strength; 3) the bags have a higher burst value; and 4) the increased toughness and higher heat seal strength allow the bag machines to be operated at faster speeds.

DETAILED DESCRIPTION OF THE INVENTION

Figure 1:
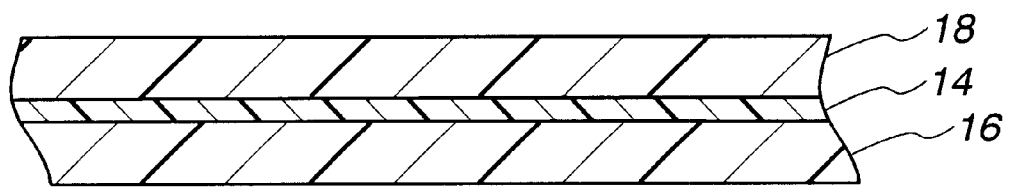
FIG. 1 is a cross-sectional view of a three-layer film of the present invention.

According to the present invention, it has been found that good heat sealability can be obtained in a multi-layer film that has been irradiated. In one embodiment of the invention, a material in the inner heat sealant layer, such as ultra low density polyethylene (ULDPE), low density polyethylene (LDPE), linear low density polyethylene (LLDPE), very low density polyethylene (VLDPE), or ionomers such as Surlyn, having incipient cross-linking at a higher radiation dose level than the material in the outer protective layer, produces an irradiated film with superior heat sealability. In one embodiment of this invention, the outer protective layer is comprised of a blend of at least 50% of an EVA resin. The inner sealant layer may be comprised of a copolymer of at least 50% ULDPE, LDPE, LLDPE, VLDPE or ionomers such as Surlyn. The ULDPE is commercially available from Dow Chemical Company under the trade name Dow 4201 and the EVA resin is commercially available from Exxon as XV-97.06, LD-306.09, LD-318.92 or LD-701.06 and DuPont as ELVAX 3129. Interposed between the inner and outer layers is a gas barrier layer.

In preferred embodiments of this invention, the outer layer comprises at least 70% EVA resin and in other embodiments the outer layer comprises at least 80% and at least 90% EVA resin.

The multiple layer films of this invention are subjected to electron beam (EB) radiation with preferred doses in the range of from about 2 megarads to about 10 megarads (MR).

In another preferred embodiment of this invention, the films are subjected to EB radiation doses of from about 2 MR to about 6 MR.

In a particularly preferred embodiment of this invention, the films are subjected to EB radiation doses of from about 4 to about 6 MR.

The multiple layer films of this invention are comprised of at least two layers. In a more preferred embodiment, the film is provided with an oxygen or flavor barrier core layer. The oxygen or flavor barrier layer is preferably a vinylidene chloride copolymer such as methyl-acrylate-polyvinylidene chloride (MA-PVdC) or ethylene vinyl alcohol (EVOH). However, it is not limited to these materials. There may also be present in the film an oxygen absorbing or oxygen scavenging material. Examples of such materials are disclosed in U.S. Pat. Nos. 4,536,409 and 4,702,966 to Farrell, U.S. Pat. No. 4,856,650 to Inoure, U.S. Pat. No. 4,919,984 to Maruhashi, U.S. Pat. No. 5,021,515 to Cochran, and U.S. Pat. No. 4,877,664 to Maeda and U.S. patent application Ser. No. 07/761,490 by Kim, the disclosure of which are incorporated herein by reference. In addition to the oxygen or flavor barrier layer and inner and outer layers, the film can also be comprised of adhesive layers and additional layers to improve the strength and toughness of the films.

The multiple layer films in the invention can be fabricated by conventional processes known in the art. These films can be either oriented or unoriented. A preferred process includes the steps of coextrusion of the layers to be oriented, followed by orientation in one of the conventional processes such as blown tubular orientation or stretch orientation in the form of a continuous sheet; both being molecular orientation processes. Once the multiple layer film has been formed and oriented, it is subjected to electron beam irradiation.

One of the advantages of the films of the present invention is that they can be coextruded and there is no need to laminate layers. Similar films known in the prior art were produced by extruding the outer layer and cross-linking it by irradiation before laminating it onto the inner layer which had been extruded separately. Thus, the ability to coextrude the inner and outer layers of the films of the present invention and expose the entire film structure to EB radiation provides the user with a significant cost savings.

The amount of electron beam irradiation is adjusted, depending on the make-up of the specific film to be treated and the end use requirements. While virtually any amount of irradiation will induce some cross-linking, a minimum level of at least 1.5 megarads is usually preferred in order to achieve desired levels of enhancement of the hot strength of the film and to expand the range of temperatures at which satisfactory heat seals may be formed. While treatment up to about 50 megarads can be tolerated, there is usually no need to use more than 10 megarads, so this is a preferred upper level of treatment; a preferred dosage being from about 2 megarads to about 6 megarads and the most preferred dosage being from about 4 megarads to about 6 megarads.

The film is subjected to electron beam irradiation only after the multiple layer film has been formed, and after molecular orientation, in those embodiments where the film is molecularly oriented. It should be noted that, in the irradiation step, all of the layers in the film are exposed simultaneously to the irradiation source, such that irradiation of all the layers of the film takes place simultaneously.

FIG. 1 shows a three layer coextruded film made according to the invention. Layer 14 is a barrier layer which minimizes the transmission of oxygen through the film. The preferred barrier material is MA-PVdC, EVOH, nylon or a VdC-VC copolymer. Layer 16 is the heat sealant layer and it is composed of a polymer having a low degree of cross-linking when subjected to irradiation. A preferred material for the heat sealant layer is ULDPE sold by Dow Chemical Company as Dow 4201. However, other copolymers, polymers and blends thereof with high dosage incipient cross-linking characteristics may be used (for example Exxon's Exact polymer and Mitsui's TAFMER). Layer 18 is the outer protective layer composed of a blend of at least from about 50% to about 100% EVA and from about 0% to about 50% ULDPE, VLDPE, LDPE, LLDPE or ionomers such as Surlyn. The preferred blend is from about 80% to about 90% EVA and from about 10% to about 20% ULDPE, VLDPE, LDPE, LLDPE or inomers such as Surlyn. The EVA in these blends can be comprised of one or more different types of EVA. One preferred blend is comprised of Exxon's LD-701.06 EVA or DuPont's ELVAX 3129 EVA, Dow Chemical's ATTANE 4201 ULDPE and Exxon's LD-318.92.

Figure 2:
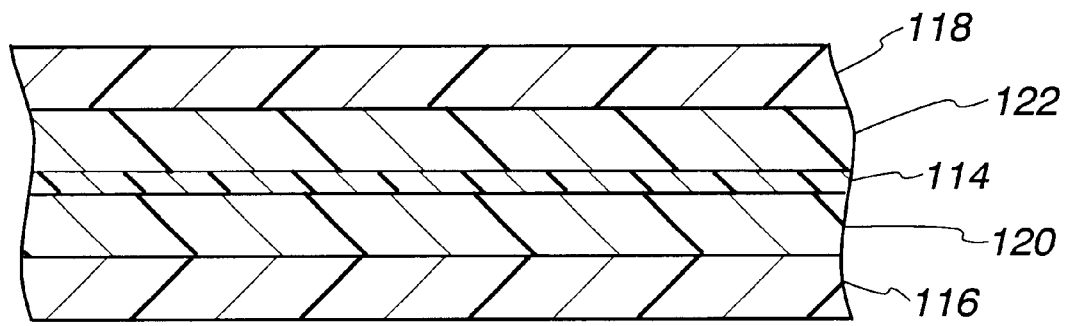
FIG. 2 is a cross-sectional view of a five-layer film of the present invention.

FIG. 2 shows a five layer coextruded film made according to the invention. Layer 114 is a barrier layer similar to layer 14. Layer 116 is a hear sealant layer similar to layer 16. Layer 118 is an outer protective layer similar to layer 18. Layer 120 is a first protective-adhesive layer composed of a blend of an EVA copolymer, preferably an EVA resin with 10% VA. Layer 122 is a second protective-adhesive layer comprising a polyethylene copolymer, preferably ULDPE, VLDPE, LDPE, LLDPE or ionomers such as Surlyn. The additional layers in the five layer film structure provide added adhesion, strength, heat resistance and toughness.

Preferred EVA's are those having 6% to 12% vinyl acetate (VA) content and having incipient cross-linking occur at about 1 to 2 MR and a gel fraction of at least 0.15 at 6 MR. Most preferred EVA's are EVA's having a vinyl acetate content of about 10%.

Preferred materials for the heat sealant layer are those having incipient cross-linking occur at about 5 MR or higher.

Figure 3:
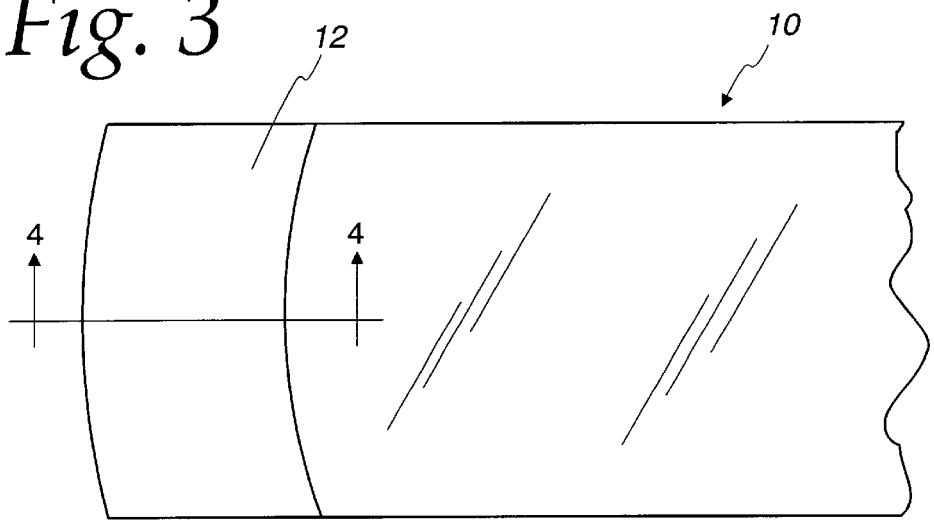
FIG. 3 is a plan view of a bag made according to the invention.

FIG. 3 shows a bag 10 made according to the invention. The empty bag shown is a collapsed, biaxially oriented tube with one end closed by a heat seal 12 across the one end of the tube. The other end of the bag is open for insertion of meat or other food article, and it is normally closed and sealed when the meat or food article is put into the bag.

Figure 4:
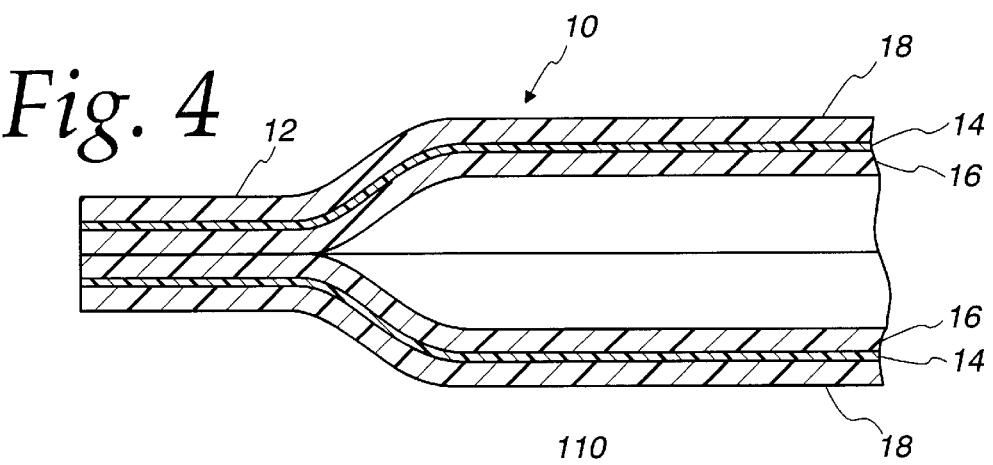
FIG. 4 is a cross-sectional view of the bag of FIG. 3 taken at 2—2 of FIG. 3.

The cross-section of the bag in FIG. 4 shows a typical structure where the bag 10 is made from a three-layer coextruded plastic film. The heat seal 12 is formed by the application of heat and pressure to fuse the heat sealant layers 16 of the two multiple layer films that form the opposing walls of the bag 10.

Figure 5:
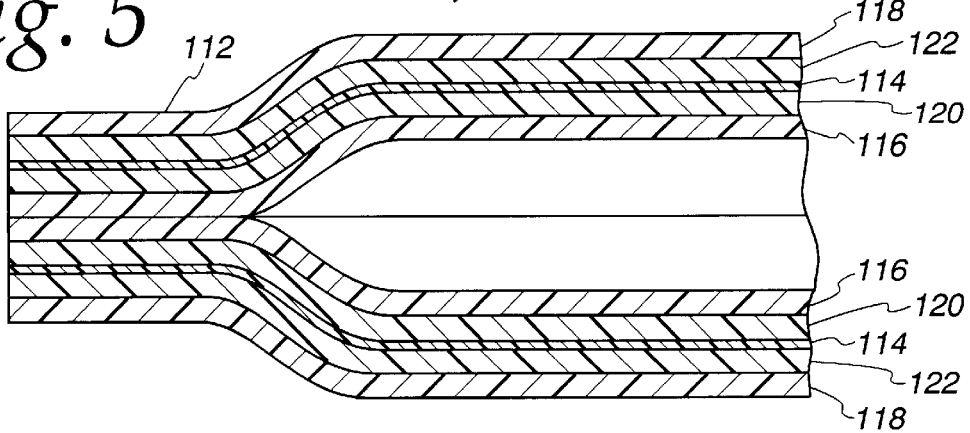
FIG. 5 is a cross-sectional view of the bag of FIG. 3 taken at 2—2 of FIG. 3, except the film is a 5 layer structure.

The cross-section of the bag in FIG. 5 shows a typical structure where the bag 110 is made from a five-layer coextruded film. The heat seal 112 is formed by the application of heat and pressure to fuse the heat sealant layers 116 of the two multiple layer films that form the opposing walls of the bag 110.

The overall thickness of films of this invention is nominally the same as the thickness of conventional films. Films are generally about 2.0 mils thick with a normal range of 1.0 to 4.0 mils. Films thinner than 1.0 mils tend to be too weak to perform all required functions. Films thicker than 4.0 mils are economically unable to compete with thinner competitive films.

Table A shows the structure of typical 3-layer films of this invention.

TABLE A

THICKNESS AND STRUCTURE OF TYPICAL THREE LAYER FILMS

| LAYER | MATERIAL | THICKNESS ($\times 10^{-2}$ Mils) |
|---|---|---|
| 1. | | |
| Sealant | ULDPE | 110 |
| Barrier | MA-PVdC | 30 |
| Protective | EVA/ULDPE | 80 |
| | | 220 |

TABLE A-continued

THICKNESS AND STRUCTURE OF TYPICAL THREE LAYER FILMS

| LAYER | MATERIAL | THICKNESS (× $10^{-2}$ Mils) |
|---|---|---|
| 2. | | |
| Sealant | ULDPE | 100 |
| Barrier | EVOH | 30 |
| Protective | EVA/ULDPE | 100 |
| | | 230 |
| 3. | | |
| Sealant | ULDPE/EVA | 80 |
| Barrier | MA-PVdC | 30 |
| Protective | EVA/ULDPE/EVA | 80 |
| | | 190 |
| 4. | | |
| Sealant | ULDPE/EVA | 90 |
| Barrier | EVOH | 30 |
| Protective | EVA/ULDPE/EVA | 60 |
| | | 180 |

Table B shows the structure of typical 5-layer films of this invention.

TABLE B

THICKNESS AND STRUCTURE OF TYPICAL FIVE LAYER FILMS

| LAYER | MATERIAL | THICKNESS (× $10^{-2}$ Mils) |
|---|---|---|
| 1. | | |
| Sealant | ULDPE | 30 |
| Second Protective | EVA | 110 |
| Barrier | MA-PVdC | 30 |
| Adhesive | ULDPE | 30 |
| First Protective | EVA/ULDPE | 30 |
| | | 230 |
| 2. | | |
| Sealant | ULDPE | 80 |
| Second Protective | EVA/ULDPE | 30 |
| Barrier | MA-PVdC | 30 |
| Adhesive | ULDPE | 30 |
| First Protective | EVA/ULDPE/EVA | 60 |
| | | 230 |
| 3. | | |
| Sealant | ULDPE/EVA | 60 |
| Second Protective | EVA/ULDPE/EVA | 30 |
| Barrier | EVOH | 40 |
| Adhesive | ULDPE/EVA | 30 |
| First Protective | EVA/ULDPE/EVA | 60 |
| | | 220 |
| 4. | | |
| Sealant | ULDPE/EVA | 80 |
| Second Protective | EVA/ULDPE | 60 |
| Barrier | EVOH | 20 |
| Adhesive | ULDPE/EVA | 30 |
| First Protective | EVA/ULDPE/EVA | 80 |
| | | 270 |

Figure 6:
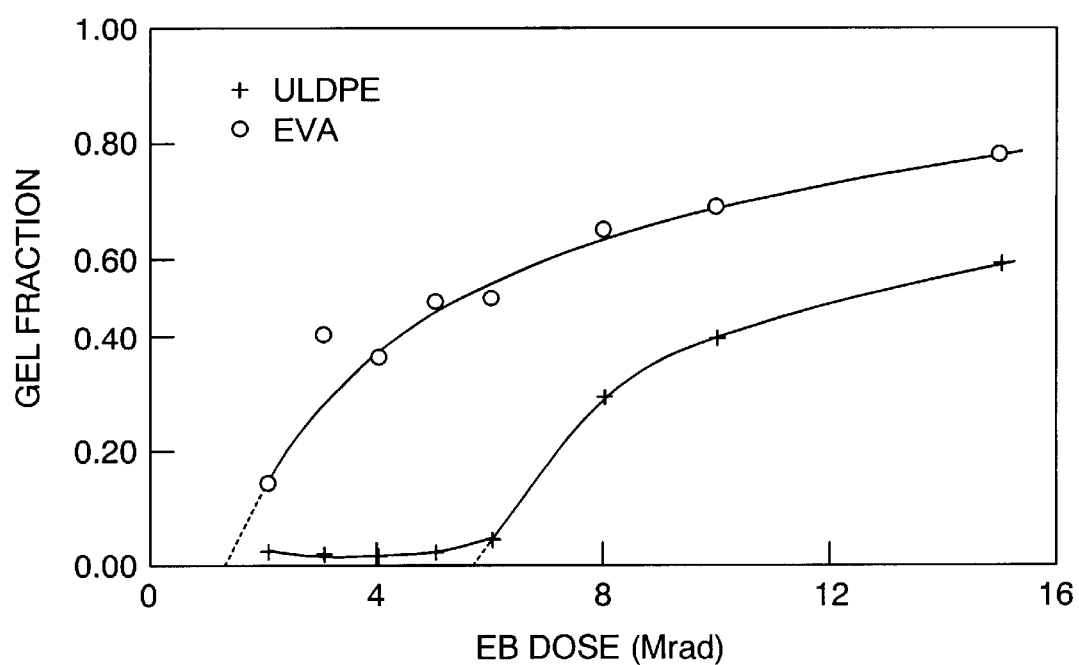
FIG. 6 is a graph of gel fraction versus radiation dose for EVA and ULDPE.

Table C shows the gel fractions for ULDPE and EVA at various irradiation doses. These results are plotted on a graph as shown in FIG. 6.

TABLE C

| IRRADIATION | GEL FRACTION | |
|---|---|---|
| EB, DOSE, MRAD | ULDPE | EVA |
| 2 | 0.03 | 0.18 |
| 3 | 0.03 | 0.42 |
| 4 | 0.02 | 0.38 |
| 5 | 0.03 | 0.50 |
| 6 | 0.04 | 0.50 |
| 8 | 0.35 | 0.62 |
| 10 | 0.41 | 0.66 |
| 15 | 0.56 | 0.75 |

It is to be understood that the films and the materials disclosed above as well as other films and materials which are apparent in view of this specification are not to be considered a limitation of the present invention, the scope of which is defined by the claims.

THE EXAMPLES

To determine the physical properties of various five layer film structures, twelve films were fabricated. These twelve films are listed in Table D and the materials of the individual layers and the irradiation dosage they were exposed to are shown for each. (Note films 1B, 2B, 6B and 8B are not listed because good heat seals could not be formed for these structures.) Also, listed as sample number nine is a three layer film known in the prior art that was used as a control for comparing the test results of the five layer films.

The twelve five layer films and the three layer control film were tested to determine tear strength, percent haze, gloss, puncture resistance, minimum sealing temperature, seal durability and impact strength. Film samples 4A, 4B, 7A and 7B represent film structures of the present invention with 7A and 7B being preferred structures.

TABLE D

COMPOSITION OF SAMPLE MULTILAYER FILMS

| SAMPLE NO. | OUTER PROTECTIVE LAYER | OUTER TIE LAYER | OXYGEN BARRIER LAYER | INNER TIE LAYER | INNER SEALANT LAYER | IRRADIATION (DOSAGE) |
|---|---|---|---|---|---|---|
| 1A | 3651 | 3651 | 3649 | 3651 | XV-97.06 | Medium |
| 2A | 3651 | 3651 | 3649 | 3651 | 306.09 | Medium |

TABLE D-continued

COMPOSITION OF SAMPLE MULTILAYER FILMS

| SAMPLE NO. | OUTER PROTECTIVE LAYER | OUTER TIE LAYER | OXYGEN BARRIER LAYER | INNER TIE LAYER | INNER SEALANT LAYER | IRRADIATION (DOSAGE) |
|---|---|---|---|---|---|---|
| 3A | 3651 | 3651 | 3649 | 3651 | 318.92 | Medium |
| 3B | 3651 | 3651 | 3649 | 3651 | 318.92 | High |
| 4A | 3651 | 3651 | 3649 | 3651 | 4201 | Medium |
| 4B | 3651 | 3651 | 3649 | 3651 | 4201 | High |
| 5A | 3651 | 4201 | 3649 | XV-97.06 | 306.09 | Medium |
| 5B | 3651 | 4201 | 3649 | XV-97.06 | 306.09 | High |
| 6A | 3651 | 4201 | 3649 | XV-97.06 | 318.92 | Medium |
| 7A | 3651 | 4201 | 3649 | XV-97.06 | 4201 | Medium |
| 7B | 3651 | 4201 | 3649 | XV-97.06 | 4201 | High |
| 8A | 3651 | 4201 | 3649 | XV-97.06 | XV-97.06 | Medium |
| 9 | 3651 | — | 3649 | — | 3651 | Medium |

WHERE:
Medium irradiation dosage is between 4 and 5.5 megarads and high irradiation dosage is between 5.5 and 6.5 megarads.
3651—is an EVA1/ULDPE/EVA2 blend. EVA1 is an EVA copolymer such as Exxon LD-701.06, XV-97.06, 318.92 or DuPont ELVAX 3129; ULDPE is a ULDPE copolymer such as Dow ATTANE 4201 and EVA2 is an EVA copolymer such as Exxon LD-318.92, LD-701.06, XV-97.06 or DuPont ELVAX 3129.
4201—is an ethylene alpha-olefin copolymer manufactured by Dow Chemical Company and sold as ATTANE 4201.
XV-97.06—is an EVA copolymer manufactured by Exxon Chemical Co. with 10% vinyl acetate (VA) and a melt index of 0.3.
LD-306.09—is an EVA copolymer manufactured by Exxon Chemical Co. with 5.8% VA and a melt index of 2.0.
LD-318.92—is an EVA copolymer manufactured by Exxon Chemical Co. with 9.0% VA and a melt index of 2.2.
3649—is a Saran comprised of a mehtylacrylate-polyvinylidene chloride copolymer.
ELVAX 3129—is an EVA copolymer manufactured by DuPont having 10% VA and a melt index of 0.35 g/10 min.
LD-701.06—is an EVA copolymer manufactured by Exxon having 10% VA and a melt index of 0.19 g/10 min.

Tear Strength Test

The comparative tear strengths of the films was measured using an Elmendorf DigiTear Tester, Model No. 65-200, available from Thwing-Albert Instrument Company, Philadelphia, Penn.

The test consisted of; 1) preparing seven representative samples of each film; 2) clamping a test specimen in the TAIR clamps of the tester; 3) slitting the film with a razor blade to initiate a slit; 4) releasing the pendulum of the tester which exerts a force on the opposing sides of the slit; and 5) recording the digital readout values of the tester. The digital readout value is the amount of force required to tear the film and it is measured in grams.

Table E below shows the results of the tear strength tests for seven specimens of each of the twelve five layer films and the three-layer control film. Each of the specimens was tested for tear strength in the machine direction (MD) and the cross-machine direction (CMD) and the results were averaged. The results indicate that the film structures of the present invention (samples 4A, 4B, 7A and 7B) have above average tear strengths, especially in the machine direction.

TABLE E

TEAR STRENGTH TEST
Tear strength is measured in grams.

| | MD | CMD | MD | CMD | MD | CMD |
|---|---|---|---|---|---|---|
| SAMPLE NO: | 1A | | 2A | | 3A | |
| | 128 | 96 | 112 | 112 | 128 | 128 |
| | 96 | 128 | 112 | 48 | 112 | 128 |
| | 112 | 144 | 112 | 48 | 112 | 112 |
| | 112 | 112 | 112 | 96 | 128 | 144 |
| | 128 | 128 | 112 | 80 | 112 | 112 |
| | 112 | 128 | 96 | 112 | 112 | 96 |
| | 112 | 144 | 96 | 112 | 96 | 128 |
| AVERAGE: | 114 | 126 | 107 | 87 | 114 | 121 |
| SAMPLE NO: | 3B | | 4A | | 4B | |
| | 116 | 132 | 152 | 64 | 160 | 184 |
| | 128 | 100 | 148 | 140 | 176 | 72 |
| | 120 | 104 | 156 | 64 | 160 | 172 |
| | 112 | 128 | 180 | 132 | 148 | 120 |
| | 120 | 100 | 184 | 76 | 172 | 76 |
| | 120 | 104 | 156 | 96 | 152 | 152 |
| | 124 | 124 | 172 | 120 | 176 | 56 |
| AVERAGE: | 120 | 113 | 164 | 99 | 163 | 119 |
| SAMPLE NO: | 5A | | 5B | | 6A | |
| | 120 | 544 | 104 | 480 | 96 | 272 |
| | 104 | 368 | 116 | 192 | 176 | 256 |
| | 108 | 288 | 108 | 592 | 96 | 256 |
| | 128 | 304 | 112 | 400 | 128 | 224 |
| | 128 | 416 | 120 | 448 | 112 | 208 |
| | 124 | 192 | 108 | 432 | 112 | 368 |
| | 124 | 528 | 124 | 416 | 112 | 336 |
| AVERAGE: | 119 | 377 | 113 | 423 | 119 | 274 |
| SAMPLE NO: | 7A | | 7B | | 8A | |
| | 128 | 176 | 132 | 236 | 96 | 480 |
| | 148 | 220 | 148 | 140 | 104 | 288 |
| | 152 | 192 | 156 | 172 | 156 | 448 |
| | 168 | 116 | 156 | 176 | 112 | 304 |
| | 172 | 108 | 160 | 104 | 100 | 432 |
| | 144 | 228 | 180 | 124 | 104 | 320 |
| | 148 | 180 | 184 | 132 | 160 | 352 |
| AVERAGE: | 151 | 174 | 159 | 155 | 119 | 375 |

TABLE E-continued

TEAR STRENGTH TEST
Tear strength is measured in grams.

| | MD | CMD | MD | CMD | MD | CMD |
|---|---|---|---|---|---|---|
| SAMPLE NO: | | 9 | | | | |
| | 88 | 212 | | | | |
| | 104 | 176 | | | | |
| | 220 | 304 | | | | |
| | 128 | 256 | | | | |
| | 240 | 256 | | | | |
| | 140 | 208 | | | | |
| | 220 | 208 | | | | |
| AVERAGE: | 163 | 231 | | | | |

Puncture Test

The puncture strengths of the twelve five layer films and the three layer control film were measured using a compression tester manufactured by Instron Corp. of Canton, Mass. The puncture test measures the amount of force needed to rupture a film. This test allows various films to be rated as to their resistance to being punctured by the contents of a package or by objects outside the package.

The test procedure consisted of the following: 1) preparing five 3" square representative film samples without delaminations; 2) driving a hemispherical-faced probe having a 6 mm diameter through a film sample being held in a circular clamp with the probe in contact with the inner sealant layer of the film; 3) attaching a crosshead to the end of the probe that is opposite to the end that is in contact with the film; 4) positioning the probe, crosshead and sample holder on the Instron compression cell, 5) compressing the crosshead and the sample holder until the probe punctures the sample film, and 6) recording the compression force (measured in pounds) required to puncture the sample film.

The puncture strengths of each of the five samples of the five-layer films and the three-layer control film are measured and an average puncture strength calculated for each film. The test results are listed below in Table F. The results indicate that the films of the invention (samples 4A, 4B, 7A and 7B) have excellent puncture strengths as compared to the other films tested.

TABLE F

Puncture resistance measured in pounds per square inch.

| SAMPLE NO: | 1A | 2A | 3A | 3B | 4A | 4B |
|---|---|---|---|---|---|---|
| | 14.9 | 14.6 | 15.1 | 14.5 | 15.5 | 16.3 |
| | 14.9 | 14.7 | 15.5 | 14.6 | 16.5 | 15.5 |
| | 15.2 | 14.2 | 15.8 | 14.0 | 15.4 | 16.0 |
| | 15.7 | 14.3 | 16.0 | 14.2 | 16.4 | 14.9 |
| | 15.9 | 14.1 | 15.2 | 13.8 | 16.8 | 17.0 |
| AVERAGE: | 15.3 | 14.4 | 15.5 | 14.2 | 16.1 | 15.9 |

| SAMPLE NO: | 5A | 5B | 6A | 7A | 7B | 8A |
|---|---|---|---|---|---|---|
| | 15.4 | 16.3 | 15.8 | 18.3 | 18.5 | 16.3 |
| | 15.6 | 15.3 | 15.5 | 18.5 | 19.0 | 15.7 |
| | 15.9 | 15.8 | 15.5 | 18.8 | 17.9 | 16.3 |
| | 15.8 | 16.5 | 15.1 | 16.8 | 18.3 | 16.0 |
| | 15.2 | 15.0 | 15.6 | 17.7 | 19.1 | 16.5 |
| AVERAGE: | 15.6 | 15.8 | 15.5 | 18.0 | 18.6 | 16.2 |

TABLE F-continued

Puncture resistance measured in pounds per square inch.

| SAMPLE NO: | 9 |
|---|---|
| | 16.3 |
| | 14.8 |
| | 15.1 |
| | 15.7 |
| | 16.1 |
| AVERAGE: | 15.6 |

Minimum Seal Temperature Test

The minimum seal temperature (MST) is the lowest temperature at which a weld seal can be achieved for making packaging seals. This test measures the effect of the cross-linking caused by irradiation on the heat seal temperature. Irradiation is known to elevate the heat seal temperature and make it more difficult to from a seal. The MST for the twelve five layer films and the three layer control film were measured in accordance with ASTM F-88 using a Sentinel Sealer.

The test was performed as follows: 1) two one inch widths of the sample film were cut in either the machine direction or the cross-machine direction into strips; 2) the two strips were placed one on top of the other with the sealant layers of the opposing films face to face; 3) the two strips of film were positioned in the Sentinel Sealer and a pressure of 50 psig for a dwell time of 1 second at an initial seal temperature of 200° F.; 4) the seal was inspected to determine if an adequate seal had been formed; 5) if an adequate seal was not achieved, steps 1 through 4 were repeated at a seal temperature 5° F. higher than the previous test until an adequate seal was achieved; 6) the test was repeated at least four more times at the seal temperature that was found to be adequate to confirm the result; and 6) the minimum seal temperature was recorded for the sample film.

The results for the films tested are listed below in Table G.

TABLE G

Minimum Seal Temperature Test (MST)
Minimum sealing temperature is measured in ° F.

| SAMPLE NO. | MST |
|---|---|
| 1A | 250 |
| 2A | 370 (film degradation observed) |
| 3A | 245 |
| 3B | 245 |
| 4A | 270 |
| 4B | 280 |
| 5A | 260 |
| 5B | 280 |
| 6A | 250 |
| 7A | 270 |
| 7B | 270 |
| 8A | 270 |
| 9 | 245 |

Seal Durability Test

The seal durability test is used to determine the level of cross-linking in a thermoplastic film resulting from electron beam (EB) radiation. This information is helpful in determining the suitability of a film for use with particular seal equipment.

The seal durability test used the Vertrod Impulse Heat Sealer with a motorized strain gauge and consisted of the following: 1) preparing six samples of each of the twelve five-layer films and the three-layer control film by cutting strips 8 inches in length in the machine direction and 1 inch wide in the cross-machine direction; 2) folding the sample strip in half along the cross-machine axis so that the sealant layers are on the inside; 3) clamping a strip of sample film in place between the sealing jaws of the Vertrod Heat Sealer and attaching one end to the strain gauge; 4) heat sealing the sample film by actuating the heater element and applying 30 psig pressure for a dwell time of 0.7 seconds; 5) activating the strain gauge motor as the seal bar raises; 6) measuring the seal durability as the motorized strain gauge stretches the heat seal and determining the peak force required to stretch the film at the heat seal; 7) visually examining the seal for burn through and/or stretching; and 8) recording the maximum value measured by the strain gauge.

The results of the seal durability test are listed below in Table H. The results indicate that the films of the invention (samples 4A, 4B, 7A and 7B) have average seal durability but are less likely to peel than most of the other films tested.

and the three-layer control film and consisted of: 1) preparing samples for each film by cutting the films into five 4 inch square specimens; 2) positioning a sample on the Hazegard System; 3) measuring the percent haze using an integrating sphere to collect light scattered by the sample film; and 4) recording the percent haze.

The results of the haze test are recorded below in Table I.

TABLE I

Haze Test
Haze is measured as the percentage of scattered light.

| SAMPLE NO: | 1A | 2A | 3A | 3B | 4A | 4B |
|---|---|---|---|---|---|---|
| | 14.2 | 13.1 | 14.4 | 13.3 | 10.0 | 9.66 |
| | 13.7 | 12.9 | 14.3 | 12.4 | 10.7 | 10.5 |
| | 14.7 | 11.7 | 14.8 | 13.8 | 11.0 | 12.1 |
| | 11.9 | 11.1 | 11.7 | 13.8 | 10.9 | 12.4 |
| | 12.5 | 13.8 | 13.0 | 14.3 | 12.2 | 10.7 |
| | 12.0 | 13.3 | 12.2 | 13.0 | 9.24 | 10.1 |
| AVERAGE: | 13.2 | 12.6 | 13.4 | 13.4 | 10.7 | 10.9 |

TABLE H

Seal Durability Test
Seal Durability is measured in ounces.

| SAMPLE NO: | 1A | 2A | 3A | 3B | 4A | 4B |
|---|---|---|---|---|---|---|
| | 16.5 NB | 12.5 NB | 15.0 NB | 15.0 NB | 15.0 NB | 17.0 NB |
| | 15.0 NB | 12.0 NB | 13.0 NB | 15.0 NB | 13.5 NB | 16.0 NB |
| | 9.5 P | 10.5 NB | 12.0 NB | 11.0 NB | 13.0 NB | 15.0 NB |
| | 14.0 P | 13.0 NB | 13.5 NB | 15.0 NB | 15.5 NB | 16.0 NB |
| | 13.0 P | 10.5 NB | 14.0 NB | 14.0 NB | 14.0 NB | 14.5 NB |
| | 11.5 P | 11.0 NB | 12.5 NB | 15.5 NB | 14.0 NB | 14.5 NB |
| AVERAGE: | 13.2 | 11.6 | 13.3 | 13.3 | 14.2 | 15.5 |

| SAMPLE NO: | 5A | 5B | 6A | 7A | 7B | 8A |
|---|---|---|---|---|---|---|
| | 15.0 P | 15.0 P | 12.0 P | 11.0 NB | 13.0 NB | 13.5 P |
| | 15.0 NB | 11.0 P | 14.5 P | 13.0 NB | 11.5 NB | 15.0 NB |
| | 12.0 P | 16.0 P | 16.5 NB | 12.5 NB | 13.5 NB | 14.0 P |
| | 10.5 P | 17.5 NB | 15.5 P | 14.0 NB | 13.0 NB | 12.0 NB |
| | 10.0 NB | 15.0 P | 16.0 P | 10.0 NB | 15.0 NB | 25.0 P |
| | 16.0 NB | 17.0 NB | 12.0 P | 10.0 NB | 10.5 NB | 22.0 P |
| AVERAGE: | 13.1 | 15.2 | 14.4 | 11.7 | 12.7 | 16.9 |

| SAMPLE NO: | 9 |
|---|---|
| | 12.0 NB |
| | 12.0 NB |
| | 10.0 NB |
| | 11.5 NB |
| | 11.0 NB |
| | 7.0 NB |
| AVERAGE: | 10.6 |

NB = No break after peak force.
P = Peeling of the layers was observed.

Haze Test

Haze is a basic measure of film clarity. Haze is defined as the amount of light that is scattered as light passes through a film.

The haze test was performed in accordance with ASTM D-1003 using a Pacific Scientific XL-211 Hazegard System. The test was performed on the twelve five layer sample films TABLE I-continued Haze Test
Haze is measured as the percentage of scattered light.

| SAMPLE NO: | 5A | 5B | 6A | 7A | 7B | 8A |
|---|---|---|---|---|---|---|
| | 10.6 | 10.9 | 11.2 | 9.37 | 13.5 | 9.35 |
| | 13.2 | 10.9 | 11.5 | 10.3 | 11.6 | 11.2 |

TABLE I-continued

Haze Test
Haze is measured as the percentage of scattered light.

| | | | | | |
|---|---|---|---|---|---|
| 12.5 | 11.8 | 12.6 | 11.5 | 12.7 | 11.2 |
| 12.0 | 13.6 | 10.3 | 11.8 | 10.5 | 11.7 |
| 12.4 | 11.8 | 10.5 | 10.8 | 9.87 | 11.5 |
| 12.1 | 13.7 | 10.2 | 11.2 | 12.3 | 13.0 |

| AVERAGE: | 12.1 | 12.1 | 11.0 | 10.8 | 11.7 | 11.3 |
|---|---|---|---|---|---|---|

| SAMPLE NO: | 9 |
|---|---|
| | 8.98 |
| | 11.10 |
| | 9.81 |
| | 8.34 |
| | 8.52 |
| | 8.71 |
| AVERAGE: | 9.2 |

Gloss Test

Gloss is a surface optical property of a film relating to the deflection of light. Gloss is measured as the percentage of light secularly reflected from the surface of the film. The Macbeth Lab-Gloss instrument was used to measure the gloss of the twelve five-layer sample films and the three-layer control film.

The gloss test consisted of the following: 1) preparing samples for each of the films by cutting the films into 4 inch square specimens; 2) positioning a sample on the Macbeth Lab-Gloss instrument; 3) reflecting a beam of light from a light Source onto the surface of the film sample at a 45 degree angle; 4) measuring the percentage of light reflecting from the surface; and 5) recording the results.

The gloss test results were recorded in Table J below.

TABLE J

Gloss Test
Gloss is measured as the percentage of light reflected when a light strikes the surface at a 45 degree angle.

| SAMPLE NO: | 1A | 2A | 3A | 3B | 4A | 4B |
|---|---|---|---|---|---|---|
| | 65.3 | 62.5 | 62.6 | 61.5 | 68.5 | 69.0 |
| | 65.4 | 63.9 | 64.5 | 63.8 | 70.4 | 68.3 |
| | 63.8 | 65.6 | 60.4 | 65.0 | 67.7 | 66.8 |
| | 61.9 | 67.1 | 65.9 | 64.1 | 67.7 | 63.7 |
| | 65.9 | 67.4 | 64.8 | 63.4 | 67.4 | 69.3 |
| | 66.8 | 65.8 | 66.5 | 62.8 | 69.4 | 68.0 |
| AVERAGE: | 64.8 | 65.3 | 64.1 | 63.4 | 68.5 | 67.5 |

| SAMPLE NO: | 5A | 5B | 6A | 7A | 7B | 8A |
|---|---|---|---|---|---|---|
| | 69.3 | 67.4 | 68.3 | 64.8 | 61.0 | 67.9 |
| | 69.9 | 69.3 | 65.0 | 68.6 | 63.8 | 68.9 |
| | 65.2 | 66.2 | 69.1 | 64.7 | 63.2 | 68.1 |
| | 64.3 | 68.8 | 68.3 | 62.8 | 60.9 | 68.3 |
| | 64.0 | 69.3 | 70.0 | 67.2 | 64.4 | 68.6 |
| | 68.0 | 68.1 | 68.7 | 67.5 | 61.5 | 69.5 |
| AVERAGE: | 66.7 | 68.1 | 68.2 | 65.9 | 62.4 | 68.5 |

| SAMPLE NO.: | 9 |
|---|---|
| | 68.2 |
| | 68.9 |
| | 67.2 |
| | 68.5 |

TABLE J-continued

Gloss Test
Gloss is measured as the percentage of light reflected when a light strikes the surface at a 45 degree angle.

| | |
|---|---|
| | 63.9 |
| | 68.7 |
| AVERAGE: | 67.5 |

Impact Strength Test

The impact strength test is used to determine the total energy impact strength of a film structure by measuring the kinetic energy lost by a free-falling dart that passes through the film. This test is useful in predicting the performance of a film used for packaging. The test simulates the action encountered in applications where moderate velocity blunt impacts occur in relatively small areas of the film.

The impact strength test uses a Kayeness Energy Absorption Impact Tester (EAIT) and consists of the following: 1) preparing samples for each of the twelve five-layer films and the three-layer control film by cutting the films into five 8-inch square specimens; 2) positing a sample films on the EAIT; 3) dropping a 35 pound probe having a 1½ inch diameter tip through the sample film; 4) measuring the force of the probe as it strikes a load cell positioned below the sample film; 5) determining the impact strength of the sample film by calculating the kinetic energy that is lost when the probe passes through the film; and 6) recording the test results.

The test results are listed in Table K below. The results indicate that the films of the invention (samples 4A, 4B, 7A and 7B) have above average impact strengths.

TABLE K

Impact Strength Test
The impact energy is measured in foot-pounds.

| SAMPLE NO. | 1A | 2A | 3A | 3B |
|---|---|---|---|---|
| | 5.96 | 5.25 | 6.05 | 4.83 |
| | 5.49 | 5.95 | 6.33 | 5.76 |
| | 5.45 | 5.84 | 6.33 | 4.79 |
| | | 5.47 | 6.07 | 4.92 |
| | | 5.56 | 6.07 | 6.00 |
| | | | | 5.83 |
| AVERAGE: | 5.64 | 5.61 | 6.17 | 5.35 |

| SAMPLE NO. | 4A | 4B | 5A | 5B |
|---|---|---|---|---|
| | 8.42 | 9.45 | 6.10 | 6.83 |
| | 9.44 | 9.41 | 6.52 | 6.89 |
| | 6.20 | 7.81 | 7.66 | 6.42 |
| | 7.90 | 8.51 | 7.31 | 7.17 |
| | 8.30 | 8.30 | 6.48 | 6.29 |
| | | 9.14 | 6.98 | |
| AVERAGE: | 8.05 | 8.77 | 6.84 | 6.72 |

| SAMPLE NO. | 6A | 7A | 7B | 8A |
|---|---|---|---|---|
| | 6.83 | 7.79 | 9.89 | 6.21 |
| | 7.00 | 10.00 | 11.25 | 6.98 |
| | 5.81 | 11.27 | 12.11 | 7.11 |

TABLE K-continued

Impact Strength Test
The impact energy is measured in foot-pounds.

|  |  |  |  |  |
|---|---|---|---|---|
|  | 6.08 | 10.29 | 11.19 | 7.04 |
|  | 5.42 | 9.35 | 11.02 | 7.09 |
|  | 6.92 | 8.60 | 13.24 | 7.44 |
| AVERAGE: | 6.34 | 9.55 | 11.45 | 6.98 |
| SAMPLE NO. | 9 |  |  |  |
|  | 8.40 |  |  |  |
|  | 7.14 |  |  |  |
|  | 7.95 |  |  |  |
|  | 6.87 |  |  |  |
|  | 7.57 |  |  |  |
|  | 7.86 |  |  |  |
| AVERAGE: | 7.63 |  |  |  |

Having thus described the invention, what is claimed is:

1. An irradiated multiple layer polymeric film comprising:
   a. an outer protective layer comprised of a blend of from at least 50% to 100% ethylene vinyl acetate resin with 6% to 12% vinyl acetate content, wherein the incipient cross-linking of said ethylene vinyl acetate resin of the outer protective layer occurs at about 1 to 2 MR and a gel fraction of at least 0.15 is present at 6 MR;
   b. an inner heat sealant layer comprised of at least 50% to 100% of a material selected from the group consisting of ultra low density polyethylene, low density polyethylene, linear low density polyethylene and ionomers, wherein the incipient cross-linking of the material of said inner heat sealant layer occurs at about 5 MR or higher;
   wherein said film is irradiated at a minimum radiation dose level of at least 1.5 megarads, wherein said outer protective layer undergoes more cross-linking than said inner sealant layer, with the proviso that no anti-oxidant cross-linking inhibitor is present.

2. A multiple layer film according to claim 1 wherein said film is subjected to from about 2 MR to about 10 MR of radiation.

3. A multiple layer film according to claim 1 wherein said film is oriented and subjected to from about 2 MR to about 10 MR of radiation.

4. A multiple layer film according to claim 1 wherein said heat sealant layer is comprised of from about 80% to about 100% of a material selected from the group consisting of ultra low density polyethylene, low density polyethylene, linear low density polyethylene, very low density polyethylene and ionomers.

5. A multiple layer film according to claim 1 wherein said protective layer is comprised of blend of from about 80% to about 90% ethylene vinyl acetate and from about 10% to about 20% of a material selected from the group consisting of ultra low density polyethylene, low density polyethylene, linear low density polyethylene, very low density polyethylene and ionomers.

6. A multiple layer film according to claim 1 further comprising a barrier layer disposed between said inner heat sealant layer and said outer protective layer.

7. A multiple layer film according to claim 6 wherein said barrier layer is a polyvinylidene chloride copolymer.

8. A multiple layer film according to claim 7 wherein said polyvinylidene chloride copolymer is a copolymer of polyvinylidene chloride and methylacrylate.

9. A multiple layer film according to claim 6 wherein said barrier layer is ethylene vinyl alcohol.

10. A heat shrinkable bag made in accordance with claim 1.

11. A heat shrinkable bag made in accordance with claim 7.

12. A heat shrinkable bag made in accordance with claim 8.

13. A heat shrinkable bag made in accordance with claim 9.

14. An irradiated multiple layer film comprising:
   a. an outer protective layer comprised of a blend of from at least 50% to 100% ethylene vinyl acetate resin with 6% to 12% vinyl acetate content, wherein the incipient cross-linking of said ethylene vinyl acetate resin of the outer protective layer occurs at about 1 to 2 MR and a gel fraction of at least 0.15 is present at 6 MR;
   b. an inner heat sealant layer comprised of at least 50% to 100% of a material selected from the group consisting of ultra low density polyethylene, low density polyethylene, linear low density polyethylene and ionomers, wherein the incipient cross-linking of the material of said inner heat sealant layer occurs at about 5 MR or higher;
   c. a barrier layer disposed between said outer protective layer and said inner heat sealant layer;
   d. a first adhesive layer disposed between said inner heat sealant layer and said barrier layer;
   e. a second adhesive layer disposed between said outer protective layer and said barrier layer;
   wherein said film is irradiated at a minimum radiation dose level of at least 1.5 megarads, wherein said outer protective layer undergoes more cross-linking than said inner sealant layer, with the proviso that no anti-oxidant cross-linking inhibitor is present.

15. An irradiated multiple layer film according to claim 14 wherein said first adhesive layer is comprised of a blend of from 50% to 100% EVA resin and from 0% to 50% of a material selected from the group consisting of ULDPE, LDPE, LLDPE, VLDPE and ionomers.

16. An irradiated multiple layer film according to claim 14 wherein said second adhesive layer is comprised of at least from 50% to 100% of a material selected from the group consisting of ULDPE, LDPE, LLDPE, VLDPE and ionomers.

17. An irradiated multiple layer film according to claim 14 wherein said barrier layer is comprised of a polyvinylidene chloride copolymer.

18. An irradiated multiple layer film according to claim 14 wherein said barrier layer is comprised of methylacrylate-polyvinylidene chloride copolymer.

19. An irradiated multiple layer film according to claim 14 wherein said barrier layer is comprised of ethylene vinyl alcohol.

20. An irradiated multiple layer film according to claim 17 wherein said film is subjected to from about 2 MR to about 10 MR of irradiation.

21. An irradiated multiple layer film according to claim 17 wherein said film is oriented and subjected to from about 2 MR to about 10 MR of irradiation.

22. An irradiated multiple layer film according to claim 18 wherein said film is subjected to from about 2 MR to about 10 MR of irradiation.

23. An irradiated multiple layer film according to claim 18 wherein said film is oriented and subjected to from about 2 MR to about 10 MR of irradiation.

24. An irradiated multiple layer film according to claim 19 wherein said film is subjected to from about 2 MR to about 13 MR of irradiation.

25. An irradiated multiple layer film according to claim 19 wherein said film is oriented and subjected to from about 2 MR to about 10 MR of irradiation.

26. A heat shrinkable bag made from an irradiated multiple layer film in claim 20.

27. A heat shrinkable bag made from an irradiated multiple layer film in claim 21.

28. A heat shrinkable bag made from an irradiated multiple layer film in claim 22.

29. A heat shrinkable bag made from an irradiated multiple layer film in claim 23.

30. A heat shrinkable bag made from an irradiated multiple layer film in claim 24.

31. A heat shrinkable bag made from an irradiated multiple layer film in claim 25.

32. An irradiated multiple layer polymeric film comprising:

a. an outer protective layer comprised of a blend of from at least 50% to 100% ethylene vinyl acetate resin with 6% to 12% vinyl acetate content, wherein the incipient cross-linking of said ethylene vinyl acetate resin of the outer protective layer occurs at about 1 to 2 MR and a gel fraction of at least 0.15 is present at 6 MR;

b. an inner heat sealant layer comprised of at least 50% to 100% of a material selected from the group consisting of ultra low density polyethylene, low density polyethylene, linear low density polyethylene and ionomers, wherein the incipient cross-linking of the material of said inner heat sealant layer occurs at about 5 MR or higher;

said film is irradiated at a minimum radiation dose level of at least 1.5 megarads, wherein said outer protective layer undergoes more cross-linking than said inner sealant layer, prepared by the method comprising:

c. coextrusion of said outer protective layer and said inner heat sealant layer to form a film;

d. orientation of said formed film by either the blown tubular orientation process or the stretch orientation process to form an oriented film; and e. irradiation of said oriented film, with the proviso that no anti-oxidant cross-linking inhibitor is present.

* * * * *